United States Patent
Opris et al.

(10) Patent No.: US 6,981,370 B2
(45) Date of Patent: Jan. 3, 2006

(54) METHOD AND APPARATUS FOR PM FILTER REGENERATION

(75) Inventors: Cornelius N. Opris, Peoria, IL (US); Maarten Verkiel, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 51 days.

(21) Appl. No.: 10/308,969

(22) Filed: Dec. 3, 2002

(65) Prior Publication Data

US 2004/0103648 A1 Jun. 3, 2004

(51) Int. Cl.
*F01N 3/02* (2006.01)

(52) U.S. Cl. .............. 60/311; 60/295; 60/274; 60/278

(58) Field of Classification Search .......... 60/274, 60/278, 295, 297, 311; 123/90.15
See application file for complete search history.

(56) References Cited

U.S. PATENT DOCUMENTS

| | | | |
|---|---|---|---|
| 4,615,172 A | 10/1986 | Mayer | |
| 4,747,264 A * | 5/1988 | Santiago et al. | 60/274 |
| 4,756,155 A * | 7/1988 | Shinzawa | 60/285 |
| 4,835,963 A * | 6/1989 | Hardy | 60/274 |
| 4,835,964 A | 6/1989 | Kume et al. | |
| 4,884,398 A | 12/1989 | Morita et al. | |
| 5,941,066 A * | 8/1999 | Araki et al. | 60/280 |
| 6,173,571 B1 | 1/2001 | Kaneko et al. | |
| 6,196,183 B1 | 3/2001 | Bauer et al. | |
| 6,276,139 B1 | 8/2001 | Moraal et al. | |
| 6,301,887 B1 | 10/2001 | Gorel et al. | |
| 6,304,815 B1 | 10/2001 | Moraal et al. | |
| 6,347,513 B2 | 2/2002 | Pfleger et al. | |
| 6,349,707 B1 | 2/2002 | Neumann et al. | |
| 6,378,297 B1 | 4/2002 | Ito et al. | |
| 6,397,587 B1 | 6/2002 | van Nieuwstadt et al. | |
| 6,575,129 B2 * | 6/2003 | Almkvist et al. | 123/142.5 R |
| 2003/0221421 A1 * | 12/2003 | Gui et al. | 60/295 |

FOREIGN PATENT DOCUMENTS

| | | | |
|---|---|---|---|
| JP | 3-271515 | * | 12/1991 |
| JP | 409013951 | * | 1/1997 |

* cited by examiner

*Primary Examiner*—Thomas Denion
*Assistant Examiner*—Diem Tran
(74) *Attorney, Agent, or Firm*—Finnegan, Henderson, Farabow, Garrett & Dunner

(57) ABSTRACT

A method and apparatus for initiating regeneration of a particulate matter (PM) filter in an exhaust system in an internal combustion engine. The method and apparatus includes determining a change in pressure of exhaust gases passing through the PM filter, and responsively varying an opening of an intake valve in fluid communication with a combustion chamber.

28 Claims, 6 Drawing Sheets

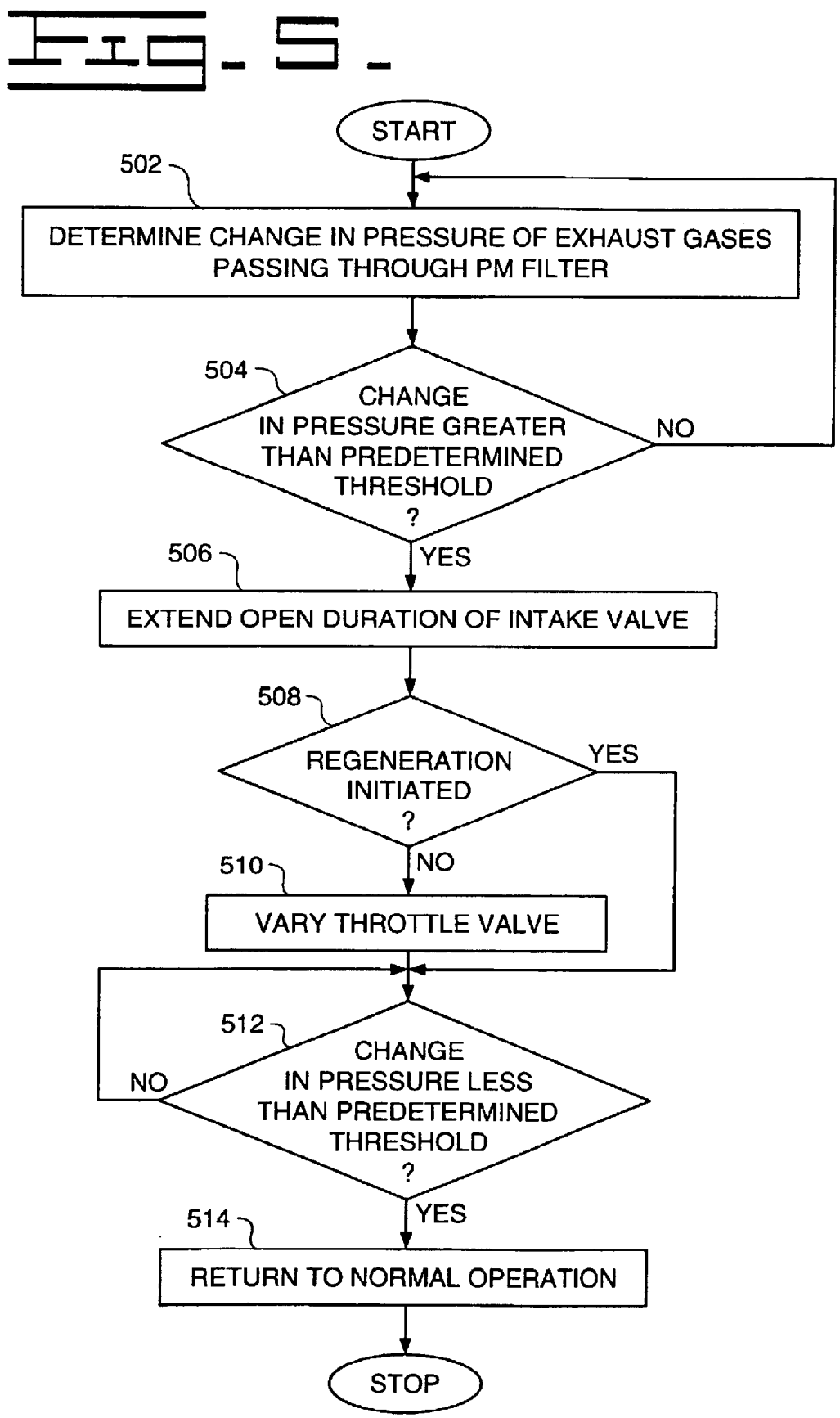

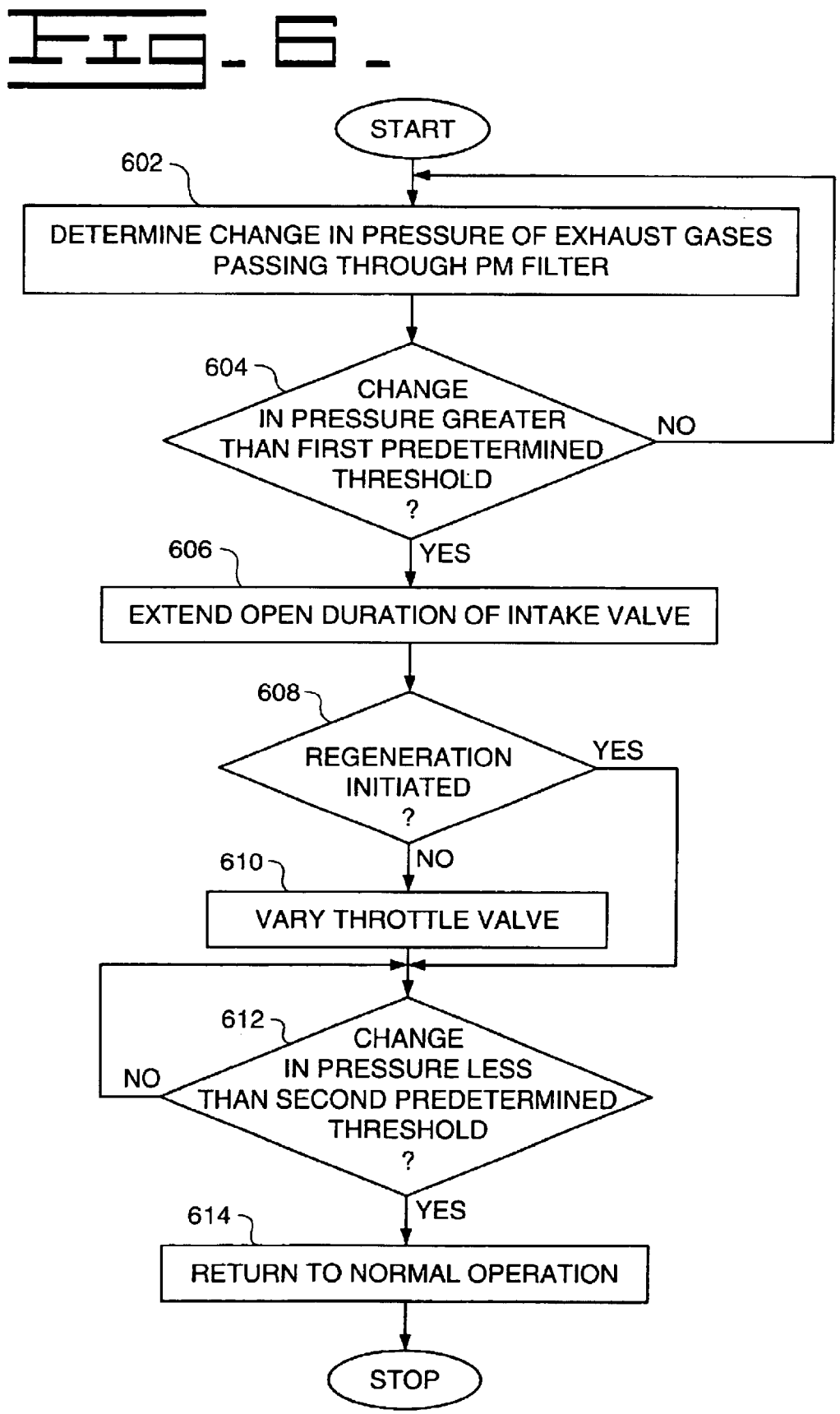

__US 6,981,370 B2__

METHOD AND APPARATUS FOR PM FILTER REGENERATION

This invention was made with government support under the terms of DOE HTCD & LTCD programs, DOE Contract Nos. DE-FC05-00OR22806 & DE-FC05-97OR22605. The government may have certain rights in this invention.

TECHNICAL FIELD

This invention relates generally to a method and apparatus for regeneration of particulate matter (PM) filters and, more particularly, to a method and apparatus for initiating regeneration of PM filters by determining a change in pressure of exhaust gases passing through a filter and changing operating conditions of an internal combustion engine to increase exhaust temperature and initiate regeneration.

BACKGROUND

Internal combustion engines perform a wide variety of useful tasks and have become an integral part of technological society over the years. Transportation and power generation needs have been met largely due to advances in engine technology, and the use of engines has become necessary for society to function.

The growth in the use of internal combustion engines, however, has resulted in severe problems and issues, one of which is the degree of pollutants being emitted by the ever-increasing number of engines in use today. The rapid increase in the levels of $NO_x$ and particulates, such as soot, has created the requirement for stringent standards to be developed to reduce such emissions as much as possible.

One method for reducing the amount of undesired pollutants is to employ an exhaust gas recirculation (EGR) system in the exhaust stream of an internal combustion engine to re-route exhaust gases back through the engine for more complete combustion to take place, thus lowering the amount of pollutants ultimately allowed to enter the atmosphere. One aspect of EGR systems is to include particulate matter (PM) filters, also known as PM traps, to filter out particles in the exhaust stream.

PM filters work well, but must be "cleaned out", i.e., regenerated, from time to time, as the particulate matter accumulates. A common method for regenerating PM filters is to increase the temperature within the filter, thus causing the accumulated matter to combust and burn. The temperature increase may be done actively by the use of heating elements installed in the filter, or may be done by increasing the temperature of the exhaust gases passing through the filter.

Several attempts have been made to control engine parameters to increase exhaust temperature to initiate regeneration. For example, in U.S. Pat. No. 6,304,815, Moraal et al. disclose a system which controls a throttle valve at an intake manifold to increase temperature for regeneration. In U.S. Pat. No. 6,196,183, Bauer et al. disclose a system which varies injection time and ignition time to initiate regeneration. In U.S. Pat. No. 6,173,571, Kaneko et al. disclose a system in which additional fuel is injected to increase temperature for regeneration.

In the above systems, however, the performance of the engine may be adversely affected by changing certain engine parameters for the purpose of increasing the exhaust temperature. For example, increasing the amount of fuel to the engine may increase exhaust temperature, but also increases fuel usage. Varying injection and ignition timing affects engine performance, for example by causing the engine to knock.

The present invention is directed to overcoming one or more of the problems as set forth above.

SUMMARY OF THE INVENTION

In one aspect of the present invention a method for initiating regeneration of a particulate matter (PM) filter in an exhaust system in an internal combustion engine is disclosed. The method includes the steps of determining a change in pressure of exhaust gases passing through the PM filter, and responsively varying an opening of an intake valve in fluid communication with a combustion chamber.

In another aspect of the present invention an apparatus for initiating regeneration of a particulate matter (PM) filter in an EGR system in an internal combustion engine having a combustion chamber and an intake valve in fluid communication thereof is disclosed. The apparatus includes means for determining a change in pressure of exhaust gases passing through the PM filter, and a controller for responsively varying an opening of the intake valve.

BRIEF DESCRIPTION OF THE DRAWINGS

FIG. 5 is a flow diagram illustrating a preferred method of the present invention; and FIG. 6 is a flow diagram illustrating an alternate method of the present invention.

DETAILED DESCRIPTION

Figure 1:
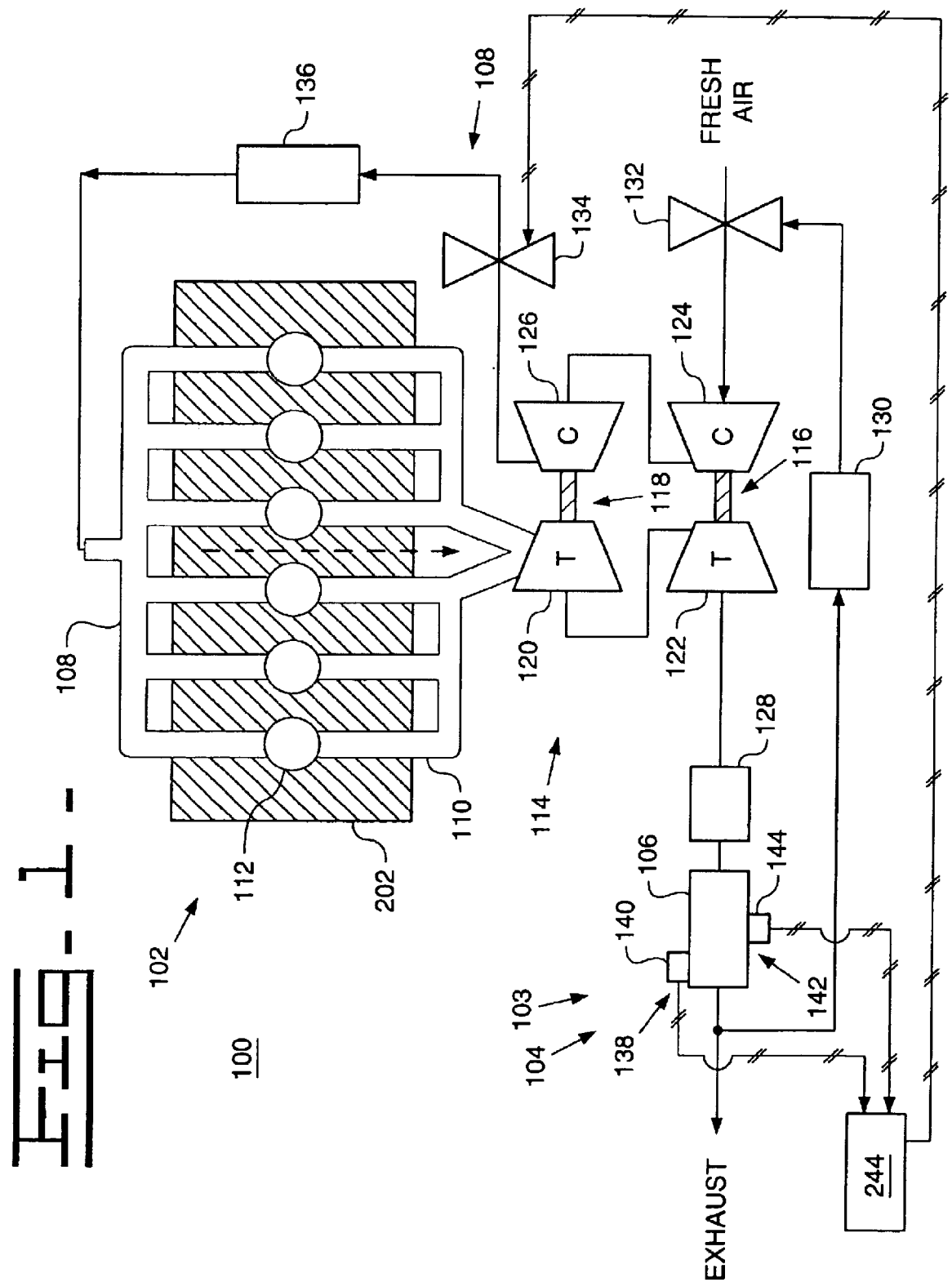
FIG. 1 is a schematic representation of an internal combustion engine having an intake and an exhaust system.

Referring to the drawings and the appended claims, a method and apparatus 100 for initiating regeneration of a particulate matter (PM) filter 106 in an exhaust system 103 in an internal combustion engine 102 is disclosed. The exhaust system 103 may include an exhaust gas recirculation (EGR) system 104.

FIG. 1 illustrates a schematic representation of an internal combustion engine 102 having an intake passageway 108 and an exhaust passageway 110. An engine block 202 provides housing for at least one cylinder 112. FIG. 1 depicts six cylinders 112. However, any number of cylinders 112 could be used, for example, three, six, eight, ten, twelve, or any other number. The intake passageway 108 provides an intake path for each cylinder 112 for air, recirculated exhaust gases, or a combination thereof. The exhaust passageway 110 provides an exhaust path for each cylinder 112 for exhaust gases.

In the embodiment shown in FIG. 1, a two-stage turbocharger system 114 is illustrated. The turbocharger system 114 includes a first turbocharger stage 116 having a low pressure turbine 122 and a first stage compressor 124. The turbocharger system 114 also includes a second turbocharger stage 118 having a high pressure turbine 120 and a second stage compressor 126. The two-stage turbocharger system 114 operates to increase the pressure of the air and exhaust gases being delivered to the cylinders 112 via the intake passageway 108, and to maintain a desired air to fuel ratio during an extended open duration of an intake valve, as is described in more detail below. It is noted that a two-stage turbocharger system 114 is not required for operation of the present invention. Other types of turbocharger systems, such as a high pressure ratio single-stage turbocharger system, a variable geometry turbocharger system, and the like, may be used instead. Furthermore, the present invention may be used with an engine 102 having no turbocharger system at all.

A throttle valve 134, located in the intake passageway 108, may be used to control the amount of air and recirculated exhaust gases being delivered to the cylinders 112. The throttle valve 134 is shown between the second stage compressor 126 and an aftercooler 136. However, the throttle valve 134 may be positioned at any location along the intake passageway 108. Operation of the throttle valve 134 is described in more detail below.

The EGR system 104 shown in FIG. 1 is typical of a low pressure EGR system in an internal combustion engine. Variations of the EGR system 104 may be equally used with the present invention. Furthermore, other types of EGR systems, for example, by-pass, venturi, piston-pumped, peak clipping, and back pressure, could be used as well. In addition, the exhaust system 103 may have no EGR system 104 at all.

An oxidation catalyst 128 receives exhaust gases from the low pressure turbine 122. The oxidation catalyst 128 may also be coupled with a De-$NO_x$ catalyst to further reduce $NO_x$ emissions. A PM filter 106 receives exhaust gases from the oxidation catalyst 128. Although the oxidation catalyst 128 and the PM filter 106 are shown as separate items, they may alternatively be combined into one package.

Some of the exhaust gases are delivered out the exhaust from the PM filter 106. However, a portion of exhaust gases are rerouted to the intake passageway 108 through an EGR cooler 130, through an EGR valve 132, and through the turbocharger system 114.

Figure 3:
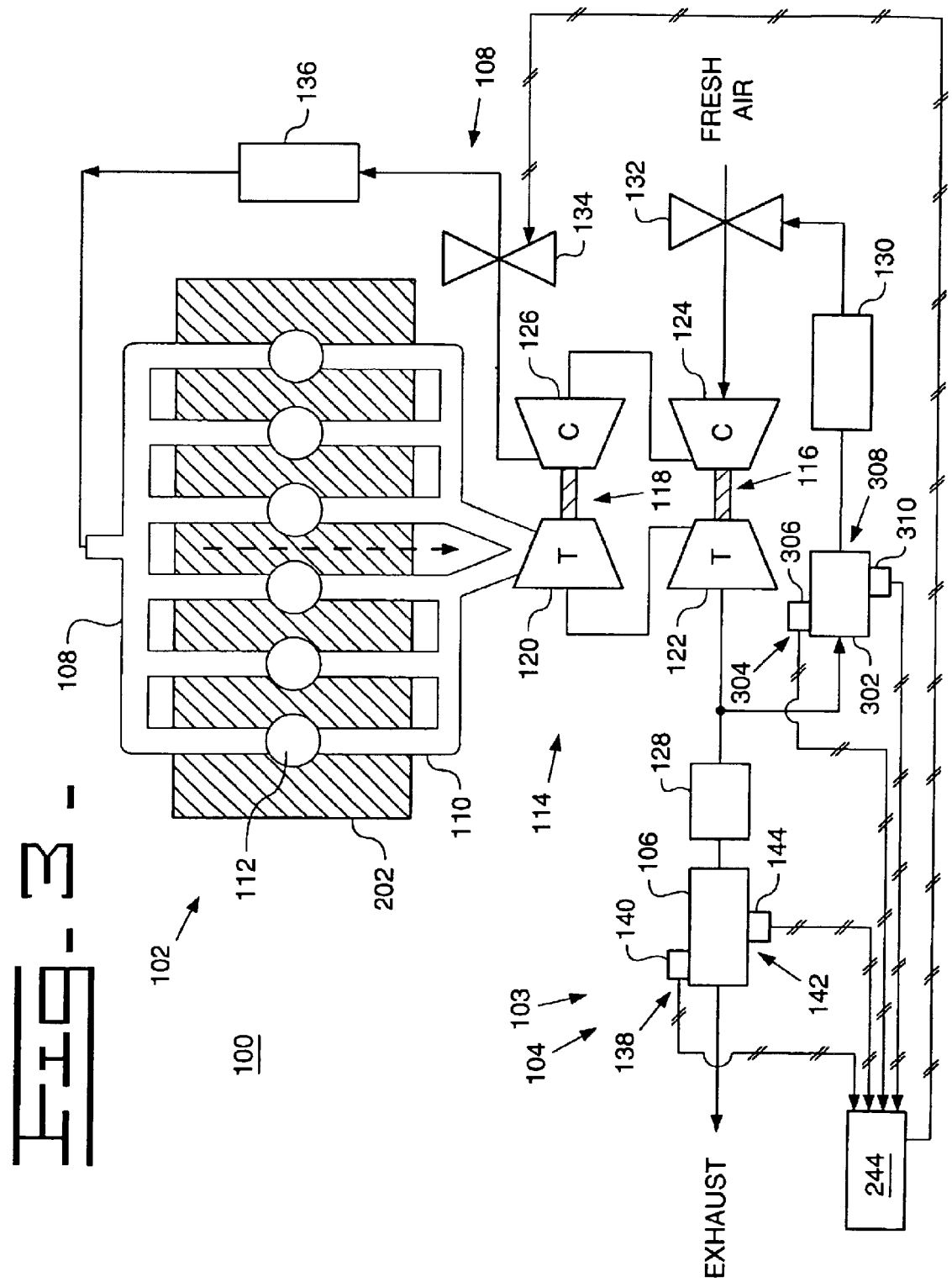
FIG. 3 is a schematic representation of an internal combustion engine having an alternate embodiment exhaust system.

FIG. 3 shows a variation of the EGR system 104 of FIG. 1. In FIG. 3, some of the exhaust gases are routed from the low pressure turbine 122, through the oxidation catalyst 128, and through the PM filter 106. However, a portion of exhaust gases are rerouted to the intake passageway 108 from the low pressure turbine 122, i.e., before entering the oxidation catalyst 128, through an additional PM filter 302, then through the EGR cooler 130, EGR valve 132, and the turbocharger system 114. The additional PM filter 302 may be smaller in size than the PM filter 106 in the main exhaust stream since only a portion of the exhaust gases need be filtered. In addition, by installing the additional PM filter 302 in the return path of the EGR system 104, the packaging and routing of the filter 302 and the associated input and output ductwork becomes more compact and manageable around the vicinity of the engine 102.

Figure 2:
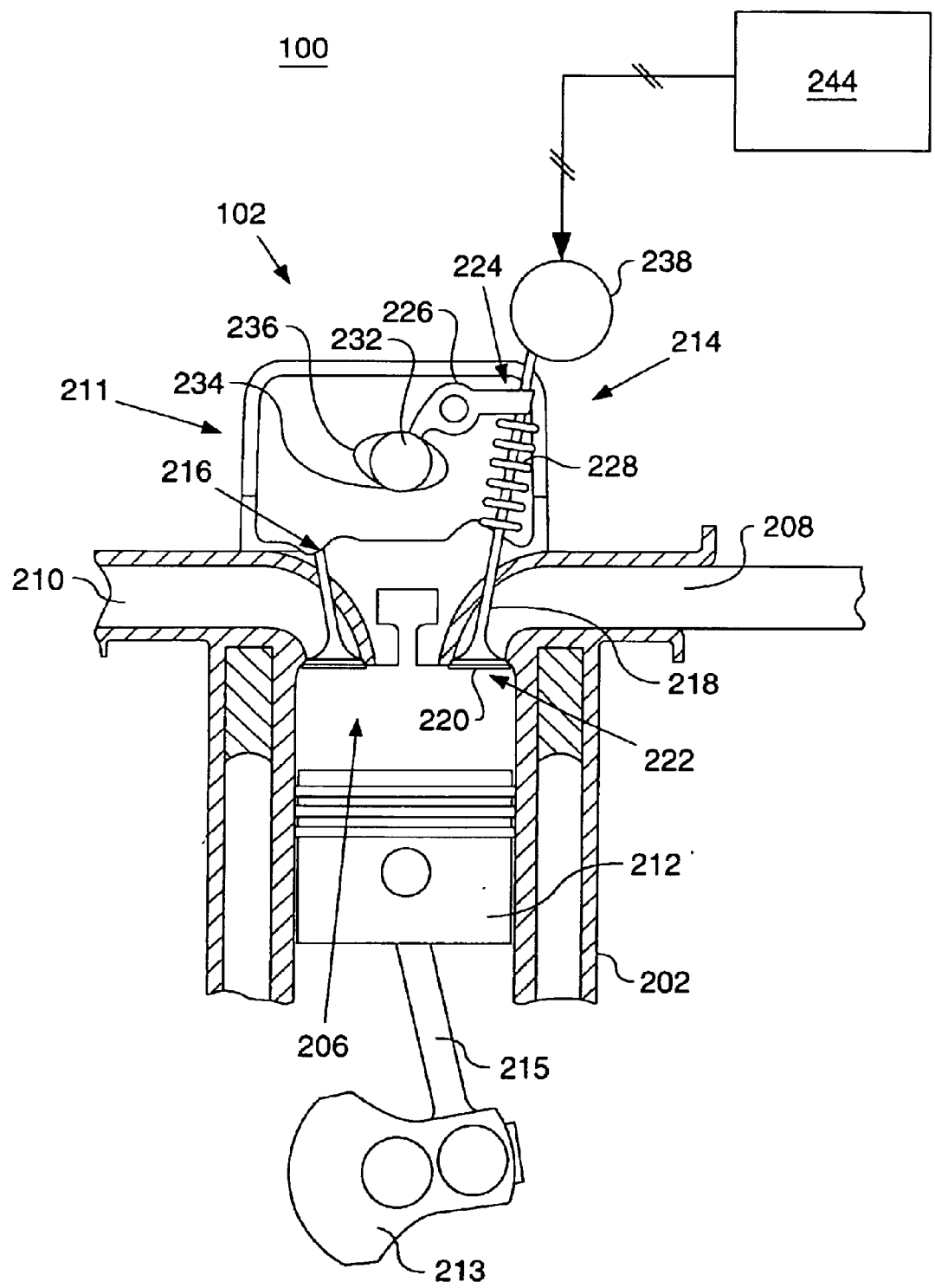
FIG. 2 is a diagrammatic and cross-sectional illustration of a portion of an internal combustion engine.

Referring to FIG. 2, a diagrammatic and cross-sectional illustration of a portion of an internal combustion engine 102 is shown. A cylinder head 211 is connected to the engine block 202. The cylinder head 211 houses one or more cylinders 112, for example six cylinders as shown in FIGS. 1 and 3. For purposes of illustration, FIG. 2 is described below with reference to one cylinder 112.

The cylinder 112 contains a piston 212 slidably movable in the cylinder 112. A crankshaft 213 is rotatably disposed within the engine block 202. A connecting rod 215 couples the piston 212 to the crankshaft 213 so that sliding motion of the piston 212 within the cylinder 112 results in rotation of the crankshaft 213. Similarly, rotation of the crankshaft 213 results in a sliding motion of the piston 212. For example, an uppermost position of the piston 212 in the cylinder 112 corresponds to a top dead center position of the crankshaft 213, and a lowermost position of the piston 212 in the cylinder 112 corresponds to a bottom dead center position of the crankshaft 213.

As one skilled in the art will recognize, the piston 212 in a conventional, four-stroke engine cycle reciprocates between the uppermost position and the lowermost position during a combustion (or expansion) stroke, an exhaust stroke, and intake stroke, and a compression stroke. Meanwhile, the crankshaft 213 rotates from the top dead center position to the bottom dead center position during the combustion stroke, from the bottom dead center to the top dead center during the exhaust stroke, from top dead center to bottom dead center during the intake stroke, and from bottom dead center to top dead center during the compression stroke. Then, the four-stroke cycle begins again. Each piston stroke correlates to about 180° of crankshaft rotation, or crank angle. Thus, the combustion stroke may begin at about 0° crank angle, the exhaust stroke at about 180°, the intake stroke at about 360°, and the compression stroke at about 540°.

The cylinder 112 includes at least one intake port 208 and at least one exhaust port 210, each opening to a combustion chamber 206. The intake port 208 is coupled to the intake passageway 108 and the exhaust port 210 is coupled to the exhaust passageway 110. The intake port 208 is opened and closed by an intake valve assembly 214, and the exhaust port 210 is opened and closed by an exhaust valve assembly 216. The intake valve assembly 214 includes, for example, an intake valve 218 having a head 220 at a first end 222, with the head 220 being sized and arranged to selectively close the intake port 208. A second end 224 of the intake valve 218 is connected to a rocker arm 226 or any other conventional valve-actuating mechanism. The intake valve 218 is movable between a first position permitting flow from the intake port 208 to enter the cylinder 112 and a second position substantially blocking flow from the intake port 208 to the cylinder 112. Preferably, a spring 228 is disposed about the intake valve 218 to bias the intake valve 218 to the second, closed position.

A camshaft 232 carrying a cam 234 with one or more lobes 236 is arranged to operate the intake valve assembly 214 cyclically based on the configuration of the cam 234, the lobes 236, and the rotation of the camshaft 232 to achieve a desired intake valve timing. The exhaust valve assembly 216 is configured in a manner similar to the intake valve assembly 214 and is preferably operated by one of the lobes 236 of the cam 234. In one embodiment, the intake lobe 236 is configured to operate the intake valve 218 in a conventional Otto or diesel cycle, whereby the intake valve 218 moves to the second, closed position from between about 10° before bottom dead center of the intake stroke and about 10° after bottom dead center of the compression stroke. Alternatively, the intake valve assembly 214 and/or the exhaust valve assembly 216 may be operated hydraulically, pneumatically, electronically, or by any combination of mechanics, hydraulics, pneumatics, and/or electronics.

In the preferred embodiment, the intake valve assembly 214 includes a variable intake valve closing mechanism 238 structured and arranged to selectively interrupt cyclical movement of and extend the closing timing of the intake valve 218. The variable intake valve closing mechanism 238 may be operated hydraulically, pneumatically, electronically, mechanically, or any combination thereof. For example, the variable intake valve closing mechanism 238 may be selectively operated to supply hydraulic fluid, for example, at a low pressure or a high pressure, in a manner to resist closing of the intake valve 218 by the bias of the spring 228. That is, after the intake valve 218 is lifted, i.e., opened, by the cam 234, and when the cam 234 is no longer holding the intake valve 218 open, the hydraulic fluid may hold the intake valve 218 open for a desired period. The desired period may change depending on the desired performance of the engine 102. Thus, the variable intake valve closing mechanism 238 enables the engine 102 to operate under a conventional Otto or diesel cycle or under a variable late-closing Miller cycle. In alternative embodiments, the intake valve 218 may be controlled by a camless system (not shown), such as an electrohydraulic system, as is well known in the art.

Figure 4:
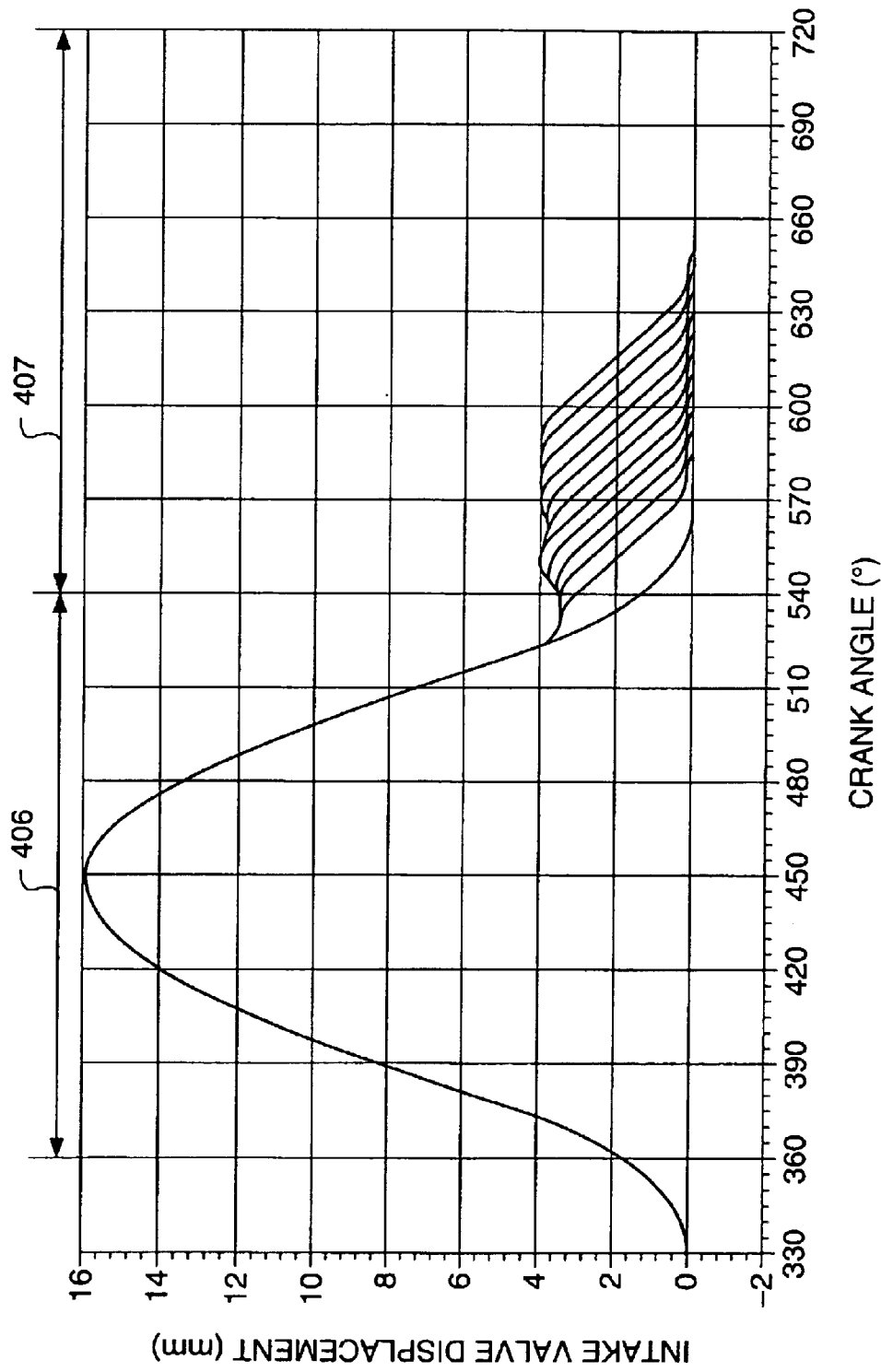
FIG. 4 is a graph illustrating control of an intake valve in an internal combustion engine.

As shown in FIG. 4, the intake valve 218 may begin to open at about 360° crank angle, that is, when the crankshaft 213 is at or near a top dead center position of an intake stroke 406. The closing of the intake valve 218 may be selectively varied from about 540° crank angle, that is, when the crankshaft 213 is at or near a bottom dead center position of a compression stroke 407, to about 650° crank angle, that is, about 70° before top center of the combustion stroke. Thus, the intake valve 218 may be held open for a majority portion of the compression stroke 407, that is, for the first half of the compression stroke 407 and a portion of the second half of the compression stroke 407.

A controller 244 may be electrically connected to the variable intake valve closing mechanism 238. Preferably, the controller 244 is configured to control operation of the variable intake valve closing mechanism 238 based on one or more engine conditions, for example, engine speed, load, pressure, and/or temperature in order to achieve a desired engine performance. It should be appreciated that the functions of the controller 244 may be performed by a single controller or by a plurality of controllers.

Referring back to FIG. 1, a means 138 for determining pressure within the PM filter 106 is shown. In the preferred embodiment, the means 138 for determining pressure includes a pressure sensor 140. However, other alternate means 138 may be employed. For example, the pressure of the exhaust gases in the PM filter 106 may be estimated from a model based on one or more parameters associated with the engine 102. Parameters may include, but are not limited to, engine load, engine speed, temperature, fuel usage, and the like.

A means 142 for determining flow of exhaust gases through the PM filter 106 may be used. Preferably, the means 142 for determining flow of exhaust gases includes a flow sensor 144. The flow sensor 144 may be used alone to determine pressure in the PM filter 106 based on changes in flow of exhaust gases, or may be used in conjunction with the pressure sensor 140 to provide more accurate pressure change determinations.

Referring again to FIG. 3, an additional means 304 for determining pressure, preferably an additional pressure sensor 306, is located with the additional PM filter 302. In like manner, an additional means 308 for determining flow of exhaust gases may be used to help determine the pressure within the additional PM filter 302. The additional means 308 for determining flow of exhaust gases preferably includes an additional flow sensor 310. Use of the additional flow sensor 310 and additional pressure sensor 306 is typically similar to that described with respect to the pressure and flow sensors 140,144 of FIG. 1.

Industrial Applicability

Operation of the present invention may be described with reference to the flow diagram of FIG. 5.

In a first control block 502, a change in pressure of exhaust gases passing through the PM filter 106 is determined. The change in pressure results from an accumulation of particulate matter, thus indicating a need to regenerate the PM filter 106, i.e., burn away the accumulation of particulate matter. For example, as particulate matter accumulates, pressure in the PM filter increases.

In a first decision block 504, it is determined if the change in pressure has exceeded a predetermined threshold, i.e., an allowable maximum pressure level. If the predetermined threshold has not been exceeded, then monitoring of the pressure continues. However, if the predetermined pressure level threshold has been exceeded, control proceeds to a second control block 506.

In the second control block 506, the open duration of the intake valve 218 is extended, preferably into the compression stroke 407, as indicated by the graph of FIG. 4. During this time period, compression of the cylinder 112 takes place. Since the intake valve 218 is open for a portion of the compression stroke, a small quantity of air or recirculated exhaust gases is forced out of the cylinder 112 by the pressure of compression. For example, the air may reduce from 80% to 70% in mass flow rate. The reduction in air, with the same amount of fuel, results in a richer mixture which, when combusted, generates a similar amount of heat, but at a higher temperature. Thus, the exhaust gases which pass from the cylinder 112 are at a higher temperature.

Preferably, the increase in temperature of the exhaust gases is enough to initiate regeneration in the PM filter 106. However, if it is determined, in a second decision block 508, that regeneration has not been initiated, control proceeds to a third control block 510. In the third control block 510, the throttle valve 134 in the intake passageway 108 is actuated by the controller 244 to partially close, thus further reducing the amount of air entering the cylinder 112. This further reduction of air results in a still richer fuel/air mixture, which in turn results in even higher exhaust gas temperatures. The throttle valve 134 is controlled in cooperation with the extended open duration of the intake valve 218 to reach the exhaust temperature needed to initiate regeneration of the PM filter 106.

It is noted that other methods for increasing the exhaust temperature may be used in cooperation with extending the open duration of the intake valve 218. For example, variable geometry turbochargers, smart wastegates, injection timing of the fuel, and the like, may be used.

In a third decision block 512, it is determined if the change in pressure of the PM filter 106 has decreased to below the predetermined threshold. If yes, then engine operation returns to normal.

FIG. 6 is a flow diagram which illustrates a slight variation from the embodiment of FIG. 5.

In a first control block 602, the pressure of the exhaust gases passing through the PM filter 106 is determined.

In a first decision block 604, it is determined if the change in pressure has exceeded a first predetermined threshold. If yes, control proceeds to a second control block 606, in which the open duration of the intake valve 218 is extended.

In a second decision block 608, it is determined if regeneration is initiated. If no, control proceeds to a third control block 610, in which the throttle valve 134 is controllably actuated.

In a third decision block 612, it is determined if the change in pressure has decreased to less than a second predetermined threshold. If yes, operations return to normal.

If the first and second predetermined thresholds are the same, then the embodiment of FIG. 6 is identical to the embodiment of FIG. 5. However, it may be preferred to set the second predetermined threshold to a value less than the first predetermined threshold to establish a range for activation and deactivation of the present invention.

It is noted that the additional PM filter 302 shown in FIG. 3 would benefit from the same methods described above with respect to the original PM filter 106 of both FIGS. 1 and 3.

Other aspects can be obtained from a study of the drawings, the disclosure, and the appended claims.

What is claimed is:

1. A method for initiating regeneration of a particulate matter (PM) filter in an exhaust system in an internal combustion engine, including the steps of:
   determining a change in pressure of exhaust gases passing through the PM filter; and
   extending an open duration of an intake valve in fluid communication with a combustion chamber beyond a normal duratio in response to the change in pressure to increase a temperature of the exhaust gases passing through the PM filter.

2. A method, as set forth in claim 1, wherein extending an open duration of an intake valve includes the step of extending an open duration of the intake valve in response to the change in pressure being greater than a predetermined threshold.

3. A method, as set forth in claim 1, wherein extending the open duration beyond a normal duration includes the step of extending the open duration into a portion of a compression stroke of the internal combustion engine.

4. A method, as set forth in claim 1, further including the step of returning the open duration of the intake valve to the normal duration in response to the change in pressure being less than the predetermined threshold.

5. A method, as set forth in claim 1, further including the step of varying a throttle valve located in an intake passageway in cooperation with varying the opening of the intake valve.

6. A method, as set forth in claim 1, wherein determining a change in pressure includes the step of sensing a difference in pressure of the exhaust gases passing through the PM filter.

7. A method, as set forth in claim 1, wherein determining a change in pressure includes the step of estimating a change in pressure as a function of at least one parameter associated with the internal combustion engine.

8. A method, as set forth in claim 2, further including the step of determining a flow of exhaust gases passing through the PM filter.

9. A method, as set forth in claim 8, further including the step of varying the opening of the intake valve in response to at least one of the change in pressure and the change in flow of exhaust gases being greater than the predetermined threshold.

10. A method for initiating regeneration of a particulate matter (PM) filter in an EGR system in an internal combustion engine, including the steps of:
    determining a change in pressure of exhaust gases passing through the PM filter; and
    extending an open duration of an intake valve in fluid communication with a combustion chamber in response to the change in pressure being greater than a predetermined threshold to reduce an amount of air available for combustion.

11. A method, as set forth in claim 10, wherein extending the open duration includes the step of extending the open duration into a portion of a compression stroke of the internal combustion engine.

12. A method, as set forth in claim 10, further including the step of returning the open duration of the intake valve to a normal open duration in response to the change in pressure being less than a second predetermined threshold.

13. A method, as set forth in claim 12, further including the steps of:
    controlling a throttle valve to reduce a flow of air through an intake passageway in cooperation with the open duration of the intake valve being extended; and
    returning the throttle valve to a position to allow a normal flow of air through the intake passageway in cooperation with the open duration of the intake valve returning to the normal open duration.

14. An apparatus for initiating regeneration of a particulate matter (PM) filter in an EGR system in an internal combustion engine having a combustion chamber and an intake valve in fluid communication thereof, comprising:
    means for determining a change in pressure of exhaust gases passing through the PM filter; and
    a controller for extending an open duration of the intake valve in response to the change in pressure to increase a fuel to air ratio.

15. An apparatus, as set forth in claim 14, further including:
    an intake passageway located in fluid communication with the intake valve; and
    a throttle valve located within the intake passageway.

16. An apparatus, as set forth in claim 15, wherein the throttle valve is actuated by the controller in cooperation with the extended open duration of the intake valve.

17. An apparatus, as set forth in claim 14, wherein the means for determining a change in pressure includes a pressure sensor.

18. An apparatus, as set forth in claim 14, further including means for determining a flow of exhaust gases passing through the PM filter.

19. An apparatus, as set forth in claim 18, wherein the means for determining a flow of exhaust gases includes a flow sensor.

20. An apparatus, as set forth in claim 18, wherein the controller is adapted to extend the open duration of the intake valve beyond a normal open duration in response to determining at least one of the change in pressure of the exhaust gases and the change in flow of exhaust gases being greater than a predetermined threshold.

21. An apparatus, as set forth in claim 20, wherein the extended open duration is a portion of a compression stroke of the internal combustion engine.

22. An apparatus for initiating regeneration of a particulate matter (PM) filter in an EGR system in an internal combustion engine, comprising:
    a combustion chamber located in the engine;
    an intake valve in fluid communication with the combustion chamber;
    a variable intake valve closing mechanism configured to keep the intake valve open by selective operation of the variable intake valve closing mechanism;
    means for determining a change in pressure of exhaust gases passing through the PM filter; and
    a controller for actuating the variable intake valve closing mechanism to extend the open duration of the intake valve in response to determining the change in pressure being greater than a predetermined threshold to increase a temperature of the gases passing through the PM filter.

23. An apparatus, as set forth in claim 22, further including:
   an intake passageway located in fluid communication with the intake valve; and
   a throttle valve located within the intake passageway, wherein the throttle valve is actuated by the controller in cooperation with the extended open duration of the intake valve.

24. An apparatus, as set forth in claim 22, wherein the means for determining a change in pressure includes a pressure sensor.

25. An apparatus, as set forth in claim 22, further including means for determining a flow of exhaust gases passing through the PM filter.

26. An apparatus, as set forth in claim 25, wherein the means for determining a flow of exhaust gases includes a flow sensor.

27. An apparatus, as set forth in claim 22, wherein the controller is adapted to extend the open duration of the intake valve beyond a normal open duration in response to determining at least one of the pressure of the exhaust gases in the PM filter increasing above a predetermined threshold and the flow of exhaust gases through the PM filter decreasing below another predetermined threshold.

28. An apparatus, as set forth in claim 27, wherein the extended open duration is a portion of a compression stroke of the internal combustion engine.

* * * * *